(No Model.)

H. K. JONES.
WOOD SCREW.

No. 373,074. Patented Nov. 15, 1887.

Witnesses.
John Edwards Jr.
Thos. S. Bishop

Inventor.
Horace K. Jones.
By James Shepard. Atty.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

WOOD-SCREW.

SPECIFICATION forming part of Letters Patent No. 373,074, dated November 15, 1887.

Application filed August 18, 1887. Serial No. 247,227. (No model.)

*To all whom it may concern:*

Be it known that I, HORACE K. JONES, a citizen of the United States, residing at Hartford, in the county of Hartford and State of Connecticut, have invented certain new and useful Improvements in Wood-Screws, of which the following is a specification.

This invention relates to that class of wood-screws made from round wire in which the thread is "rolled on;" and the object of my improvement is by the peculiar ribbed portion of the shank immediately under the head to retain more rigidly in desired position plates of metal through which said screws may pass, as described in detail hereinafter.

Figure 1:
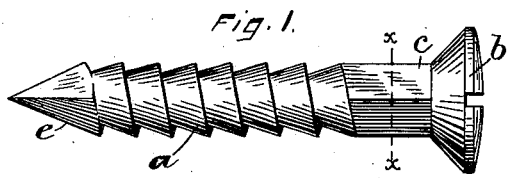
Figure 2:
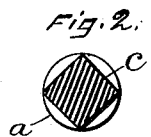
Figure 3:
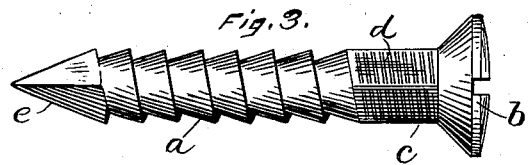
Figure 4:
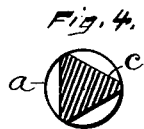
Figure 5:
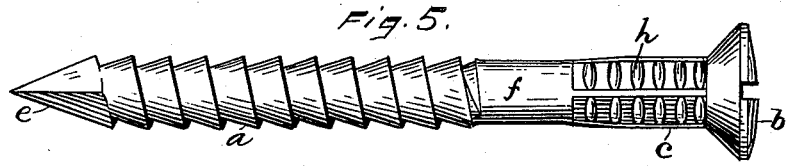

In the accompanying drawings, Figure 1 is a side elevation of a screw of my new form. Fig. 2 is a cross-section of the same, taken on line $x\ x$ and looking toward the threaded end. Fig. 3 is a side elevation having the several faces of the neck immediately under the head slightly roughened. Fig. 4 is a cross-section of a similar screw having a triangular neck; and Fig. 5 is a side elevation of one of my screws with a plain portion between the thread and the ribbed portion of the shank, the latter having transverse as well as longitudinal ribs.

The main body of said screw (designated in the drawings by the letter $a$) is provided with a rolled screw-thread. Immediately under the head is left a neck, $c$, which is longitudinally ribbed or angular in cross-section and forms an important feature of my invention. Heretofore, so far as I am familiar with the art of screw-making, this neck has been left round and of the normal diameter of the wire stock from which the screw was made. The act of rolling on the thread invariably raises and throws out radially the outer edge or highest part of the screw-thread, thereby increasing its diameter and leaving the unthreaded portion of the wire much smaller than the threaded portion.

When screws so formed are used for securing to wood surfaces metallic plates having a hole or holes of sufficient size to receive the threaded body of the screw, the neck under the head will be too small to fill such hole, and thereby allow the plate to move in a lateral direction. Should such a screw after a time become loosened, or the wood slightly shrunken, the metal plate may move laterally a considerable distance. This is particularly objectionable in the case of escutcheons, strike-plates, butt-hinges, and all that class of builders' hardware in which plates of metal are secured to wood surfaces. To overcome this defect, I make immediately under the head a ribbed neck, $c$, as shown, by swaging the round-wire stock and forcing outward two or more longitudinal ridges until they approximately align with the perimeter of the threaded body portion $a$, and thus fill a hole that will just receive said threaded portion. When so formed, the slight loosening of one or more screws does not allow the metal and its attachments to move laterally, (as above referred to,) but continues to retain it in proper position.

The shaping of the neck $c$ to accomplish the above result is done by the grippers in the act of forming the head, so that no additional expense is incurred by adding said angular or ribbed form. This neck may extend to the threaded portion, as shown in Figs. 1 and 3, such construction being best adapted for short screws. In longer screws the neck may stop short of the thread, thereby leaving a plain portion, $f$, of the normal size and shape of the wire, as shown in Fig. 5.

In Fig. 3 I have shown the neck $c$ slightly roughened by indenting or "burring" its several faces, (see $d$,) the same being produced by roughened faces on the grippers. If desired, instead of a mere roughening, the gripping-dies may be provided with well-defined transverse grooves to produce well-defined transverse ribs $h$, Fig. 5, the tops or outer edges of which will project diametrically beyond the normal size of the wire stock.

I claim as my invention—

A screw having a threaded portion, the diameter of which is larger than the normal diameter of the wire from which said screw is made, and a longitudinally-ribbed neck adjacent to the head, the greatest diameter of said neck being approximately the same as that of the threaded portion, substantially as described, and for the purpose specified.

HORACE K. JONES.

Witnesses:
   THOS. S. BISHOP,
   M. S. WIARD.